US009626708B2

United States Patent
Danielson et al.

(10) Patent No.: US 9,626,708 B2
(45) Date of Patent: Apr. 18, 2017

(54) PHOTOGRAPHIC MEMENTOS (71) Applicant: Thirty-One Gifts LLC, Columbus, OH (US)

(72) Inventors: Elizabeth Ann Danielson, Trinidad, CO (US); Mark Eric Danielson, Trinidad, CO (US)

(73) Assignee: Thirty-One Gifts LLC, Columbus, OH (US)

( * ) Notice: Subject to any disclaimer, the term of this patent is extended or adjusted under 35 U.S.C. 154(b) by 919 days.

(21) Appl. No.: 13/862,652

(22) Filed: Apr. 15, 2013

(65) Prior Publication Data

US 2014/0310122 A1  Oct. 16, 2014

(51) Int. Cl.
*G06Q 30/06* (2012.01)
(52) U.S. Cl.
CPC ................... *G06Q 30/0621* (2013.01)
(58) Field of Classification Search
CPC ..................... G06Q 30/0621; G06F 15/00
See application file for complete search history.

(56) References Cited

U.S. PATENT DOCUMENTS

| 5,916,650 | A | * | 6/1999 | Rosenbaum | ............ | G09F 19/12 40/702 |
| 5,960,411 | A | * | 9/1999 | Hartman | .............. | G06Q 10/087 705/26.8 |
| 5,974,401 | A |   | 10/1999 | Enomoto et al. | | |
| 6,181,409 | B1 | * | 1/2001 | Calhoun | .............. | G03B 27/521 355/39 |
| 6,701,845 | B2 |   | 3/2004 | Ohmura | | |
| 6,909,889 | B2 |   | 6/2005 | Ishikawa | | |
| 6,915,273 | B1 |   | 7/2005 | Parulski | | |
| 6,931,419 | B1 | * | 8/2005 | Lindquist | ............. | G06Q 10/109 705/26.1 |
| 7,243,079 | B1 |   | 7/2007 | Manolis et al. | | |
| 8,340,057 | B2 | * | 12/2012 | Abujbara | ............ | H04L 63/0892 370/328 |
| 8,370,271 | B1 | * | 2/2013 | Robinson | ............. | G06Q 10/083 705/26.7 |
| 8,694,590 | B2 | * | 4/2014 | Logue | ................... | G06F 3/1208 370/389 |

(Continued)

OTHER PUBLICATIONS

Dena Fishbein "Create covers for photo albums and scrapbooks" News Sentinel (Jun. 12, 2012).*

*Primary Examiner* — Naeem Haq
(74) *Attorney, Agent, or Firm* — Porter, Wright, Morris & Arthur, LLP (57) ABSTRACT

A method of providing a photographic memento is provided. The method includes receiving, at a computer system from a mobile computing device of a user, an order for a photographic memento that includes photo data, formatting instructions, and account information. The method includes printing a formatted image on a first side of a rigid substrate and printing supplemental information on a second side of the rigid substrate. The formatted image is based on the photo data and the formatting instructions and the supplemental information is based on the order data. The method further includes cutting the photographic memento from the rigid substrate in a predefined shape and generating shipping information for the photographic memento based on account information and/or the order data.

25 Claims, 7 Drawing Sheets

(56) References Cited

U.S. PATENT DOCUMENTS

| | | | | |
|---|---|---|---|---|
| 8,885,206 B2* | 11/2014 | Polk | ................. | G06F 3/1243 |
| | | | | 358/1.18 |
| 2012/0092685 A1* | 4/2012 | Barrett | ................. | 358/1.6 |
| 2012/0210200 A1* | 8/2012 | Berger | ................. | G06F 3/04845 |
| | | | | 715/202 |
| 2013/0238392 A1* | 9/2013 | Sloan | ................. | G06Q 30/0201 |
| | | | | 705/7.29 |
| 2013/0304604 A1* | 11/2013 | Hoffman | ................. | G06Q 30/0621 |
| | | | | 705/26.5 |

* cited by examiner

PHOTOGRAPHIC MEMENTOS

FIELD

The present application relates to photographic mementos. More specifically, the present application relates to methods of generating photographic mementos and photo tags for user reconfigurable photo displays.

BACKGROUND

While technologies for storing, manipulating, and printing photographic images have changed over time, the desire to capture and retain memories using photographic images has remained largely unchanged. Traditional photographic printing methods provided photographs printed on paper or paper-like media. Photographs printed using these methods are typically either framed in a permanent or semi-permanent manner for viewing or are stored in a stacked manner. In some cases, printed photos are arranged into groups where the photographs in the groups are related based on content, an event, or a specific period of time. These groups of photos are sometimes put together in the form of a collage or photo album. The photos in collages and photo albums cannot typically be easily rearranged or reconfigured because the photos are often attached to the arrangement in a semi-permanent manner. Furthermore, even in cases where the photos can be easily removed from a collage or photo album, the paper-like media on which the photo is printed may become worn or damaged due to handling and manipulation.

SUMMARY

A method of providing a photographic memento is provided. The method includes receiving, at a computer system from a mobile computing device of a user, an order for the photographic memento. The order includes photo data, formatting instructions, and account information. The method further includes printing a formatted image on a first side of a rigid substrate and printing supplemental information on a second side of the rigid substrate. The formatted image is based on the photo data and the formatting instructions and the supplemental information is based on the order data. The method further includes cutting the photographic memento from the rigid substrate in a predefined shape and generating shipping information for the photographic memento based on the account information and/or the order data.

Other examples introduced herein also include other methods, systems with various components, and non-transitory machine-readable storage media storing instructions that, when executed by one or more computer processors, direct the one or more computer processors to perform the methods, variations of the methods, or other operations described herein. While multiple embodiments are disclosed, still other embodiments will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present invention will be described and explained through the use of the accompanying drawings in which.

DETAILED DESCRIPTION

In the following detailed description, various specific details are set forth in order to provide an understanding of and describe the techniques and apparatuses introduced here. However, the techniques may be practiced without the specific details set forth in these examples. Various alternatives, modifications, and/or equivalents will be apparent to those skilled in the art without varying from the spirit of the introduced apparatuses and techniques. For example, while the examples described herein refer to particular features, the scope of this solution also includes techniques and implementations having different combinations of features and embodiments that do not include all of the described features. Accordingly, the scope of the techniques and solutions introduced herein are intended to embrace all such alternatives, modifications, and variations as fall within the scope of the claims, together with all equivalents thereof. Therefore, the description should not be taken as limiting the scope of the invention, which is defined by the claims.

Photographs are often displayed in frames. Frames offer a permanent or semi-permanent method of displaying photos. It is often desirable to group photos together based on relationships between the contents of the photos. For example, photos may be grouped with respect to family members, a period of time, an event, to show a progression of events, or for other reasons. Photo albums or collages of photos are often used to display groups of photos with these types of relationships. However, photo albums and collages cannot typically be easily reconfigured when a different arrangement of photos is desired. Even in cases where the photos can be removed from the albums, frames, or collages, typical photo media is relatively fragile and the photos are at risk of damage or degradation when handled or transferred from one album or display to another. In some cases, it is also desirable to display photos in an arranged manner for one period of time while still retaining the ability to easily remove a photo from the display at another point in time in order to rearrange the photos on the display, to store one of the photos, or to transfer a photo to another person or display.

Disclosed herein are systems and methods for producing and displaying photographic mementos that resolve the problems described above with respect to traditional photo albums, frames, and collages. In the disclosed systems and methods, images are transmitted to a printing provider to be printed on a durable, rigid substrate to produce photographic mementos or photo tags. The photographic mementos can be displayed on a display panel in a reconfigurable manner. The photographic mementos can be displayed on the display panel in user selected combinations or orders and then reconfigured, stored, or removed at a later time with minimal effort and with minimal concern about damage to or degradation of the photographic mementos. The terms "photographic memento" and "photo tag" are used interchangeably herein to describe any object containing a photographic image that can displayed on a display board or panel.

Figure 1:
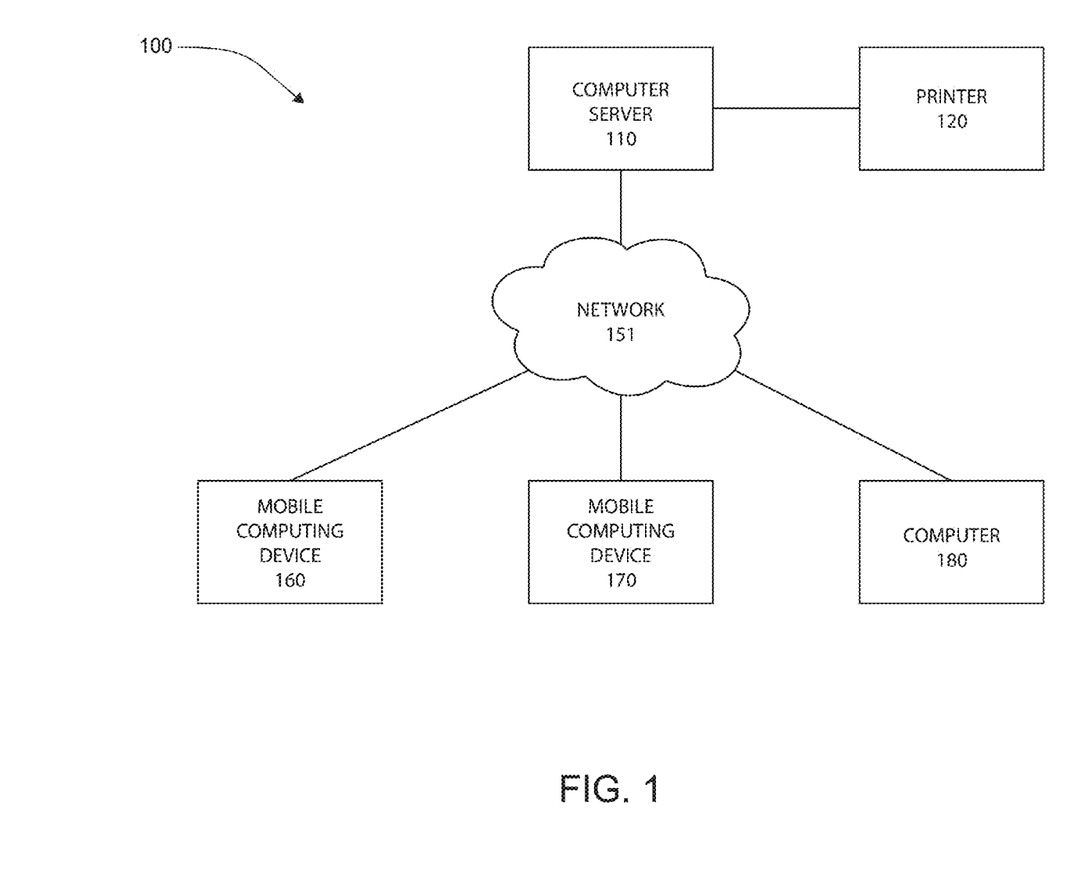
FIG. 1 illustrates an operating environment in which techniques disclosed herein may be utilized.

FIG. 1 illustrates operating environment 100 in which techniques disclosed herein may be utilized. FIG. 1 includes computer server 110, network 151, mobile computing device 160, mobile computing device 170, computer 180, and printer 120.

Computer server 110 may comprise any type of computing device that is capable of communicating with other computing devices over a network, such as network 151, and is capable of communicating with a printing device, such as printer 120. Computer server 110 may be a single computing device or may include functional elements that are contained within a plurality of other computing systems and/or distributed across a plurality of physical locations. Computer server 110 may include a server, a group of servers, a virtual machine, a personal computer, a group of personal computers, a notebook computer, or a computing device of another type, including combinations thereof. Computer server 110 may include one or more of a variety of components such as: a user interface, a keyboard, a mouse, a display, a communication interface, a power supply, a volatile data storage device, and a nonvolatile data storage device.

Printer 120 may comprise any device for generating images on a substrate. Printer 120 may include a laser printer, an inkjet printer, a plotter, a laser engraver, a phase change printer, a chemical etching device, a dye diffusion printer, a dye sublimation printer, or another type of device for transferring an image to a substrate, including combinations thereof.

Mobile computing device 160 and mobile computing device 170 may each be one or more of a cellular phone, a mobile phone, a smartphone, a personal digital assistant, a digital camera, a notebook computer, or a tablet computer.

Computer 180 may be any type of computing device for electronically communicating with computer server 110 and/or other devices. Computer 180 may be a notebook computer, a personal computer, an Internet terminal, and/or a tablet computer. Computer 180 may include one or more of a variety of components such as: a user interface, a keyboard, a mouse, a display, a communication interface, a power supply, a volatile data storage device, and a nonvolatile data storage device.

Network 151 may comprise any network for communicating digitized data from one location to another. Network 151 may include an intranet, the Internet, a local area network (LAN), a wide area network (WAN), a wireless network, a wireless fidelity (WiFi) network, a cellular network, or any other communication path, including combinations thereof. The devices of FIG. 1 are illustrated as communicating over a single network, network 151. However, communications between the devices may be conducted over multiple networks, separate networks, and/or various combinations of networks, including wireless networks.

In one example, computer server 110 may be configured for generating a photographic memento. In this example, computer server 110 receives an order for the photographic memento from mobile computing device 160 or from mobile computing device 170. The order may include photo data, formatting instructions, and account information. The photo data may have been captured or generated using a camera of mobile computing device 160. For example, mobile computing device 160 may be a smartphone with a digital camera and may be capable of capturing and storing digital images. After receiving the order from mobile computing device 160, computer server 110 may command printer 120 to print a formatted image that is based on the photo data on a first side of a rigid substrate. Computer server 110 may also command printer 120 to print other information on a second side of the rigid substrate. The printing may occur on the two sides of the rigid substrate simultaneously or sequentially. The second side of the rigid substrate may be made available for printing by manually flipping the rigid substrate from the first side. Alternatively, a printer may automatically print on both sides of the substrate or automatically access both sides of the substrate for printing.

The formatting of the image that is printed on the rigid substrate may be based on formatting instructions received by computer server 110 from mobile computing device 160. The information that is printed on the second side of the rigid substrate may include tracking information for the order that is based on the received order data. As is discussed in further detail below, a plurality of images or photographic mementos may be printed on a single sheet of the rigid substrate by printer 120. This plurality of images or photographic mementos may be printed sequentially or simultaneously. A second image printed on the rigid substrate may be a duplicate of the first image printed on the substrate, may be a different image also provided by the user of mobile computing device 160, or may be a different image provided another user, such as a user of mobile computing device 170. In other words, computer server 110 may be in communication with and receive photographic memento orders from multiple mobile computing devices. In response, computer server 110 may command printer 120 to print images from multiple user on a single sheet of the rigid substrate.

Printing the photographic mementos on a rigid substrate makes them more durable and allows them to be hung on a display board without being affixed to, adhered to, or otherwise held against, a foundational surface as it typically done in a picture frame or a photo album. The photographic mementos are self-supporting in the sense that they are not at significant risk of curling, tearing, folding, or other similar damage, even though they are not affixed to another surface. Consequently, the photographic mementos can be added to or removed from a photo display with minimal effort. The rigid substrate may be plastic, wood, metal, or a combination thereof. In one specific example, the rigid substrate is extruded polyvinyl chloride (PVC). In some examples, the rigid substrate is planar.

In another example, the rigid substrate may be non-planar and may include more than two surfaces for printing images (e.g., a polyhedron with more than two planar printing surfaces).

In yet another example, photos may be individually printed on planar elements that are then assembled to form a polyhedron with multiple printed surfaces.

In yet another example, photos may be individually printed on planar elements that are assembled into a three dimensional collage of the photos wherein the rigid nature of the photos allow them to become part of the collage without requiring frames or other support.

As is discussed in further detail below, a software application may be executed on mobile computing device 160 and/or mobile computing device 170 to facilitate ordering of the photographic memento including selection of formatting instructions or options for formatting a photo on the photographic memento. The formatting instructions or options may include color choices, background choices, framing options, message options, font options, size options, shape options, or other options for customizing the appearance of the photographic memento. The software application may also enable the user of mobile computing device 160 or 170 to perform image processing functions on the image before transferring it to computer server 110 for the photographic memento. For example, the software application may enable the user to crop the image, adjust the color of the image, rotate the image, or otherwise make changes to the image before it is transmitted.

The software application may also facilitate communication with computer server 110 and/or provide account management functions. For example, when transmitting the image information to computer server 110, the software application may automatically identify the user based on information previously supplied to the software application by the user. The software application may also automatically identify the user based on identifying information of mobile computing device 160. In addition, the software application may transmit user or account identifying information to computer server 110 such that computer server 110 can properly apply a charge for the printing and/or shipping of the completed photographic memento to an account of the user. The account may be maintained on computer server 110 or another computing device with which computer server 110 communicates.

In one example, a user sets up an account associated with printing of photographic mementos using computer 180. It is sometimes easier to perform the data entry associated with establishing an account using a computing device, such as computer 180, that includes a full size keyboard and/or full size display. Using computer 180, the user establishes an account at computer server 110. In some cases, the user may set up the account by visiting a website associated with the printing service. The website may be hosted by computer server 110 or may be hosted by another computer system that communicates with computer server 110. Establishing an account may include one or more of: providing identifying information, providing information about a method of payment, pre-purchasing credits for printing of photographic mementos, providing one or more shipping addresses, selecting a preferred shipping method, selecting formatting preferences, selecting a username, selecting a password, and/or identifying approved users of the account.

Once an account and associated preferences have been established, the user can upload an image using the software application running on mobile computing device 170. In this way, the user does not have to enter all of the account information through the smaller interface of mobile computing device 170. In addition, a photo taken using mobile computing device 170 does not have to be transferred to computer 180 to place an order. When creating the account, the user may enter a list of potential shipping addresses (e.g., family members, grandparents, etc.) using computer 180. When placing a future order, a list of these potential shipping addresses may be made available to the user in the software application running on mobile computing device 170 such that the user has to make only a simple selection of one of the previously entered addresses rather then enter the entire address. In some cases, the user may select multiple addresses and one or more copies of the photographic memento may be shipped to each of the addresses.

Figure 2A:
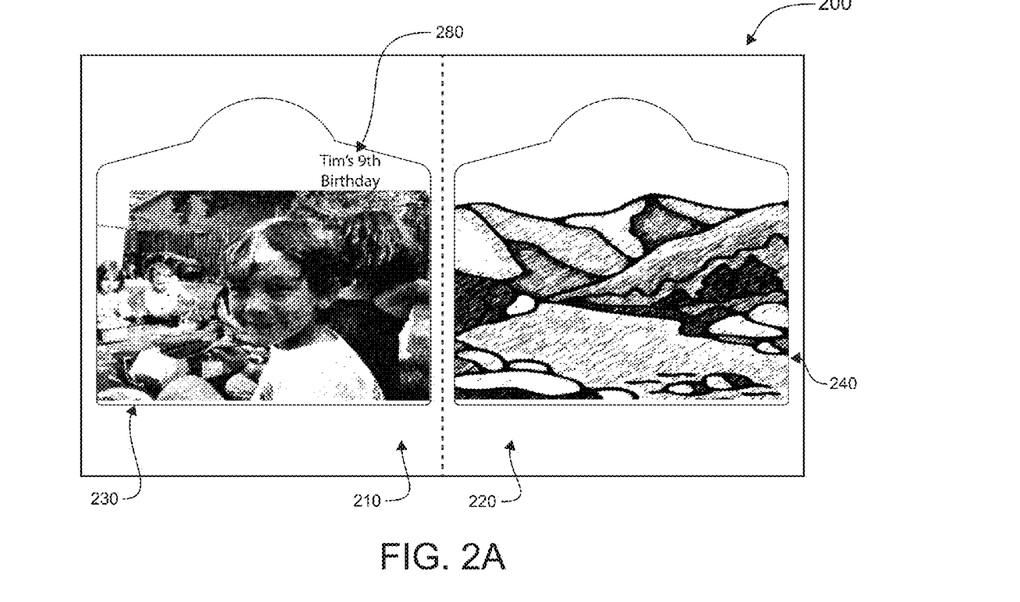
FIG. 2A illustrates a front side of a rigid substrate on which photos are printed in one example of the techniques disclosed herein.

FIG. 2A illustrates a front side of a planar rigid substrate 200 on which formatted photo data is printed in one example of the techniques disclosed herein. Rigid substrate 200 is illustrated as having space for printing of two photographic mementos or photo tags. However, rigid substrate 200 may also be sized for printing of a single photo tag or any other number of photo tags, including photo tags of a variety of shapes and sizes. Rigid substrate 200 includes area 210 and area 220 for printing of each of the associated photo tags. After printing, each photo tag will be cut from rigid substrate 200 in a predefined shape. The shape is indicated by predefined shape 230 and predefined shape 240. Although predefined shapes 230 and 240 may not actually be visible on rigid substrate 200, they may be visible in the software application to provide a user an indication of which portions of a selected photograph will be included in the photo tag once it is cut from rigid substrate 200.

The software application may also enable the user to select from a list of multiple predefined shapes for the photographic memento. Predefined shapes 230 and 240 are illustrated as being of the same size and shape, but could be of different shape and/or sizes than each other. The predefined shape may be round, oval, square, rectangular, or may be of some other stylized shape for presenting images in an attractive manner. As is discussed in further detail below, the predefined shape may also include a feature to accommodate hanging of the photo tag. Photo tags may be cut from rigid substrate 200 to form predefined shapes 230 and 240 using a variety of methods including die cutting, laser cutting, waterjet cutting, plasma cutting, cutting with a toothed blade, or some combination thereof.

As illustrated in FIG. 2A, a photo tag may also include one more messages, such as message 280. Message 280 may be overlaid on the photo or may be printed adjacent to the photo. In addition, message 280 may be customized using a variety of fonts, font sizes, font colors, positions, and/or angles. A user may enter a customized message using the software application or may select from a list of predefined messages (e.g. "Thanksgiving Dinner").

Figure 2B:
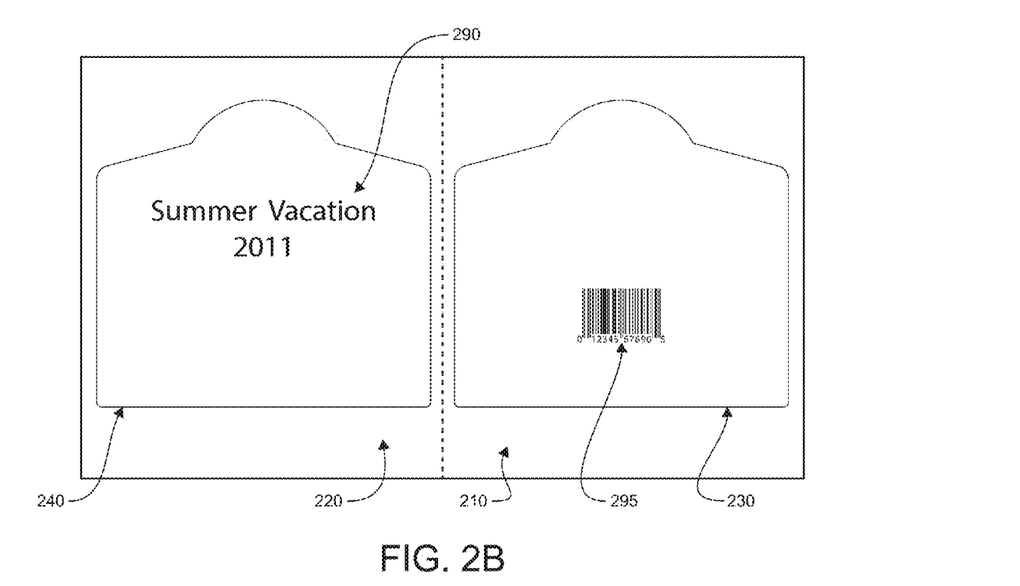
FIG. 2B illustrates a back side of a rigid substrate on which photos are printed in one example of the techniques disclosed herein.

FIG. 2B illustrates a back side of rigid substrate 200 of FIG. 2A. Because rigid substrate 200 is being viewed from the opposite side, area 220 now appears on the left and area 210 now appears on the right, as do predefined shape 240 and predefined shape 230, respectively. As with FIG. 2A, predefined shapes 230 and 240 do not necessarily actually visually appear on rigid substrate 200 but provide an indication of where the photo tags will eventually be cut from rigid substrate 200. As indicated, additional or supplemental information may be printed on the back side of the substrate. In some cases, further information may also be printed on the photo tag. The further information may include text, another image, a computer generated graphic, a border, a background, and/or other types of information related to the photo or related to the photo order. In the example of FIG. 2B, message 290 is printed on the back of rigid substrate 200. In some cases, a message may be printed on both sides of a photo tag.

In some cases, order or tracking information, such as tracking information 295, may be printed on the back of a photo tag. In FIG. 2B, tracking information 295 is printed in the form of a linear bar code. Tracking information may also be printed on a photo tag in the form of a two dimensional bar code, in the form of a quick response (QR) code, or in some other encoded and/or condensed manner. In another example, tracking information may be printed on the photo tag in human-readable form. In yet other cases, tracking information may be stored in an electronic or magnetic device that is attached to the photo tag. Magnetic strips and radio frequency identification (RFID) tags are examples of devices that contain information that may be attached to or embedded in a photo tag. In some cases, these devices may contain further information related to the photo(s) printed on the photo tag such as a detailed list of the people included in the photo(s), a description of the event(s) in the photo(s), and/or an audio recording related to event(s) in the photo(s). This type of information may be stored in some type of electronic or memory device that is attached to the photo tag. Alternatively, the photo tag may contain a QR code, a bar code, or other information that directs someone to a location where the associated information is stored (e.g. a URL for a website).

Tracking information 295 may include one or more pieces of order information for a producer of a photo tag to track the photo tag and/or insure that is prepared for delivery to the correct shipping destination. The one or more pieces of order information may include: a customer name, an account number, a shipping address, an order number, an item number, and/or another piece of information. In some cases, racking information 295 may identify an account of the user who ordered the photo tag or may simply include a tracking number which can be used to identify an account or user in another system.

Figure 3A:
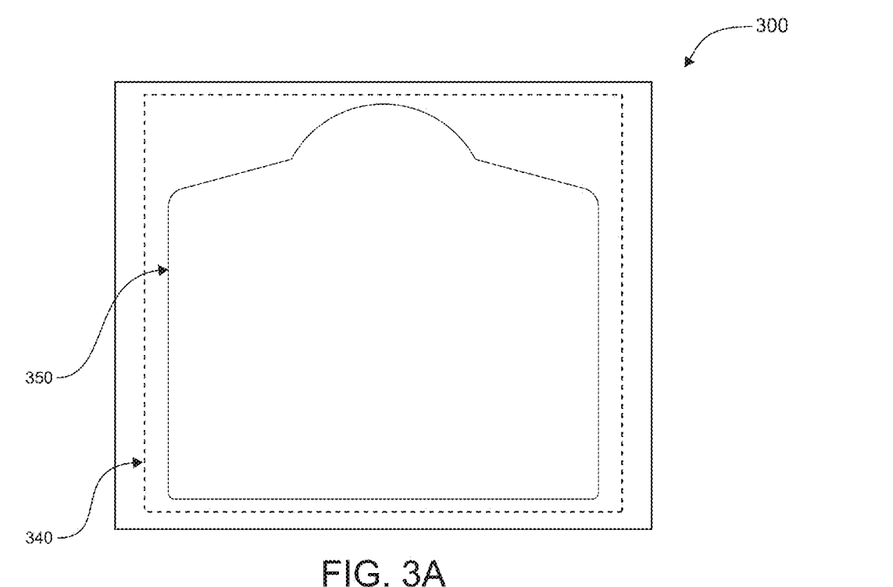
FIG. 3A illustrates a layout of a photographic memento on a rigid substrate in one example of the techniques disclosed herein.

FIG. 3A illustrates a layout of a photo tag on rigid substrate 300 in one example of the techniques disclosed herein. A photo tag of predefined shape 350 will be cut from rigid substrate 300 after the photo has been printed on rigid substrate 300 by a printer, such as printer 120. In this example, the photo may be printed on an area of rigid substrate 300 that is larger than predefined shape 350 where predefined shape 350 represents the eventual perimeter of the photo tag. The photo print area is represented by photo area 340. Because photo area 340 is larger than predefined shape 350, the printed photo will extend beyond the edges of the resulting photo tag. In other words, the photo will cover the entire surface of the photo tag without any border around the photo, even if the photo tag is a non-square or non-rectangular shape. A user may provide an indication of how much photo area 340 should extend beyond predefined shape 350 through use of a software application running on mobile computing device 160 or through a website accessed using computer 180. A user may also use other image processing tools to zoom in or zoom out on the image relative to the size of the photo tag that will be produced.

Figure 3B:
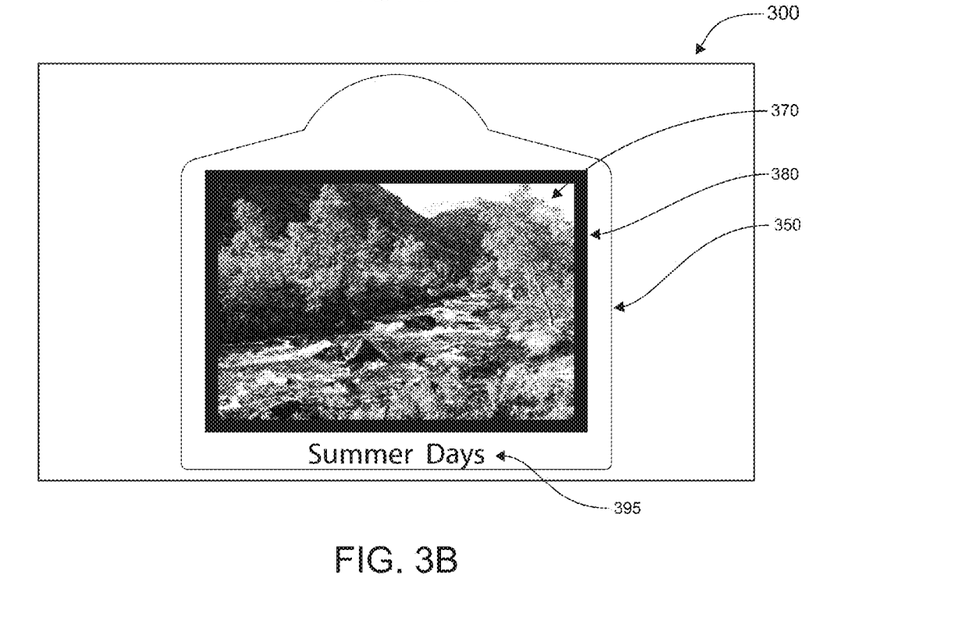
FIG. 3B illustrates formatting of a photographic memento in one example of the techniques disclosed herein.

FIG. 3B illustrates formatting of a photographic memento in one example of the techniques disclosed herein. In contrast to the example of FIG. 3A, formatted photo 370 of FIG. 3B does not extend to the edges of predefined shape 350. In other words, the photo will not cover the entire surface of the resulting photo tag. Consequently, the user may wish to have a photo frame or photo border, such as photo border 380, printed around formatted photo 370 in order to emphasize the photo or to make the presentation of the photo more aesthetically pleasing. Characteristics of the border, such as color and thickness, may be selected by the user requesting the photo tag. The characteristics may be entered by the user or may be selected from a list of predefined options. The selections may be made in a software application running on mobile computing device 160 and/or may be made by accessing a website or other electronic interface from which computer server 110 receives information.

A message, or other text, printed on a photo tag may be printed on the tag outside of photo border 380 or may be printed over photo border 380 and/or formatted photo 370, partially or completely. A photo tag may contain text or graphics on a back side of the photo tag in addition to or in place of text or graphics on the front side of the photo tag.

In another example, a photo tag may contain more than one photo printed on each of the front side and/or the back side of the photo tag. In some cases, one or more of the photos may be computer generated graphics, computer generated images, or computer generated icons rather than a photographic image.

In yet another example, the techniques disclosed herein may also include printing the area of a photo tag that lies outside of a photo and/or photo border. For example, with respect to FIG. 3B, the area of predefined shape 350 that is outside of photo border 380 may be printed with a background pattern to make the photo tag more visually appealing and/or to provide additional contrast to formatted photo 370 and/or to photo border 380. The background pattern may comprise a series of small objects, dots, and/or a pattern printed on rigid substrate 300. The background pattern may also comprise printing a solid color on rigid substrate 300.

Figure 4:
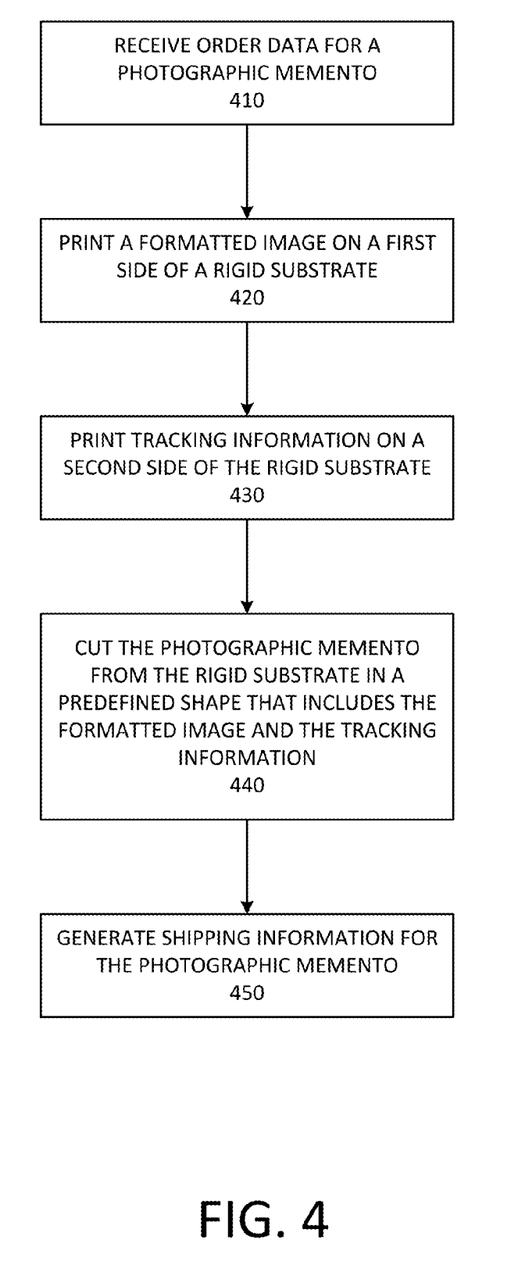
FIG. 4 illustrates a method of generating a photographic memento in one example of the techniques disclosed herein.

FIG. 4 illustrates a method of generating a photographic memento in one example of the techniques disclosed herein. The method includes, at step 410, receiving order data for a photographic memento at a computer system from a mobile computing device of a user. The method further includes printing a formatted image on a first side of a rigid substrate (step 420) and printing tracking information on a second side of the rigid substrate (step 430). At step 440, the method includes cutting the photographic memento from the rigid substrate in a predefined shape that includes the formatted image and the tracking information. Finally, at step 450, the method includes generating shipping information for the photographic memento.

Figure 5:
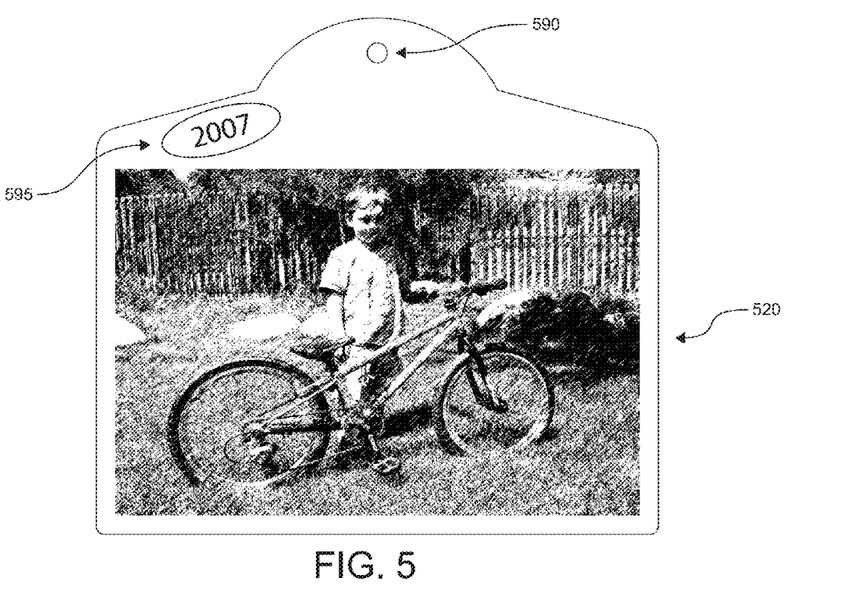
FIG. 5 illustrates an example of a photo tag.

FIG. 5 illustrates photo tag 520 that includes aperture 590 for hanging. Photo tag 520 is produced using the techniques disclosed herein. As in previous examples, a photograph has been printed on photo tag 520. The photo may cover only a portion of photo tag 520 or may expand to all of the edges of photo tag 520. As illustrated, photo tag 520 may also include one more text passages or messages, such as text 595. Text passages or messages may also contain a border or background. Photo tag 520 also includes aperture 590 for hanging photo tag 520 on a hook, dowel, shaft, nail, pin, or other element that fits through aperture 590. Aperture 590 may be cut, punched, etched, reamed, or drilled through photo tag 520. In one example, aperture 590 is die cut at the same time that photo tag 520 is die cut from a rigid substrate.

Figure 6:
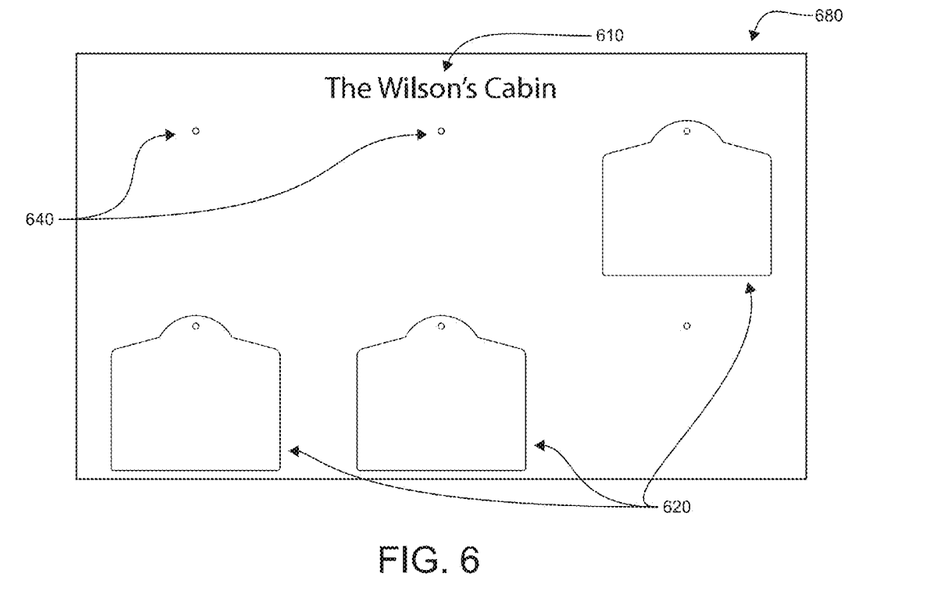
FIG. 6 illustrates a display board for displaying a group of photo tags.

FIG. 6 illustrates a display 680 for displaying a group of photo tags 620. Display 680 is any type of panel, board, fixture, or other device that contains a surface for hanging photo tags 620. The surface of display 680 contains hooks 640 for hanging photo tags 620. Display 680 may be formed from wood, metal, plastic, ceramic, or a combination thereof. Hooks 640 may be pieces that are originally separate from display 680 or may be integrally formed as part of display 680. In one example, display 680 is a finished wood panel and hooks 640 are metallic hooks that are attached to display 680 using threads. In another example, display 680 is an injection molded panel and hooks 640 are formed as part of display 680 during the molding process.

Photo tags 620 may be easily hung on and removed from hooks 640. Because photo tags 620 can be easily removed from display 680, a user can easily change or rearrange the photo tags displayed on display 680. In some cases, a photo tag may be removed from display 680 and hung on another display similar to display 680. Because the photo tags are made using a rigid substrate, photo tags 620 are durable and will not easily curl, warp, fray, or tatter. Consequently, photo tags 620 can be easily handled and switched between displays. In some cases, a printing process and substrate may be used which makes photo tags 620 resistant to humidity and/or water damage. In addition, photo tags 620 will maintain a planar appearance even though they are not adhered to or held against the surface of display 680. Display 680 may contain a title or message, such as title 610, that is written or printed on display 680. Although, display 680 is illustrated as being of a rectangular shape, it could be any other shape and may contain any number of hooks 640 for photo tags.

Other methods for hanging photo tags 620 on display 680 in an easily removable manner are possible. In one example, a finger or other protrusion may be formed in or attached to one or more of photo tags 620. In this example, display 680 contains holes or other cavities for receiving the fingers of photo tags 620. In addition, display 680 may be configured for displaying photo tags of various sizes and/or shapes.

Figure 7:
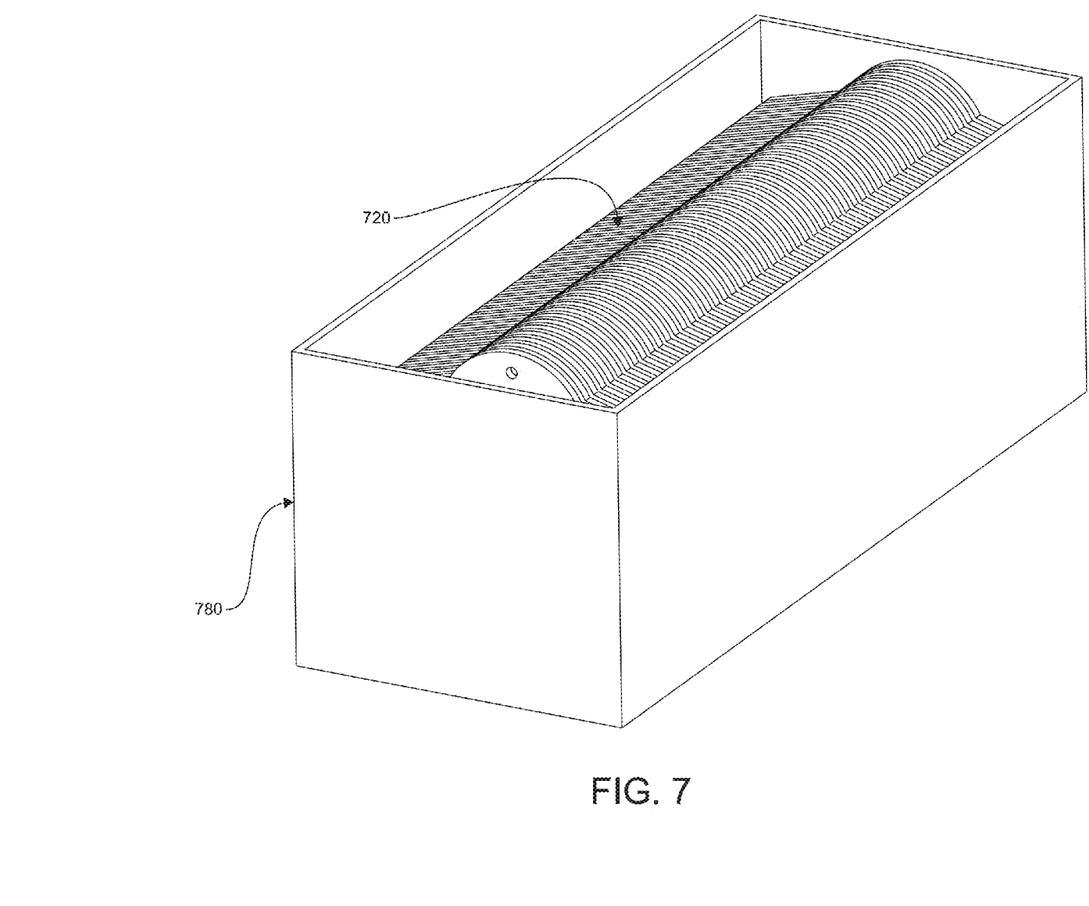
FIG. 7 illustrates an example of a storage container for photo tags.

FIG. 7 illustrates storage container 780 for storing a plurality of photo tags 720. Container 780 may be used for storing photo tags 720 when they are not in use or when they are being transported. Because a display, such as display 680, makes it easy for a user to change and rearrange photo tags, a user may have more photo tags than will be displayed at any one time. Therefore, it is useful to have a convenient storage container or location for the remaining photo tags, such as container 780. If all of photo tags 720 are of the same predefined shape, one or more dimensions of container 780 may be chosen such that container 780 is large enough for photo tags 720 to be inserted into and removed from container yet small enough to minimize movement of photo tags 720 once they are in container 780.

In one example, container 780 may also include a lid that can be secured in place. The lid may further minimize the movement of photo tags 720 within container 780. In another example, container 780 may also include a support that performs a book end function by holding photo tags 720 in place when the number of photo tags in container 780 is such that photo tags 720 do not fill the entire space of container 780. For example, container 780 may be dimensioned for holding 20 photo tags stacked side-by-side. When a quantity of less than 20 photo tags is in container 780, the support holds the quantity of photo tags against one end of container 780 to minimize movement of the photo tags within container 780.

In the example of FIG. 7, container 780 has a square cross-section to accommodate the roughly square shape of photo tags 720. Container 780 may also have a different cross-section shape in order to accommodate photo tags of other shapes. In one variation, container 780 may be lined with a material to prevent scratching or scuffing of photo tags 720. In another variation, container 780 may contain a tray with predefined slots or guides for holding photo tags 720 such that photo tags 720 are not in contact with each other when stored in container 780.

Figure 8:
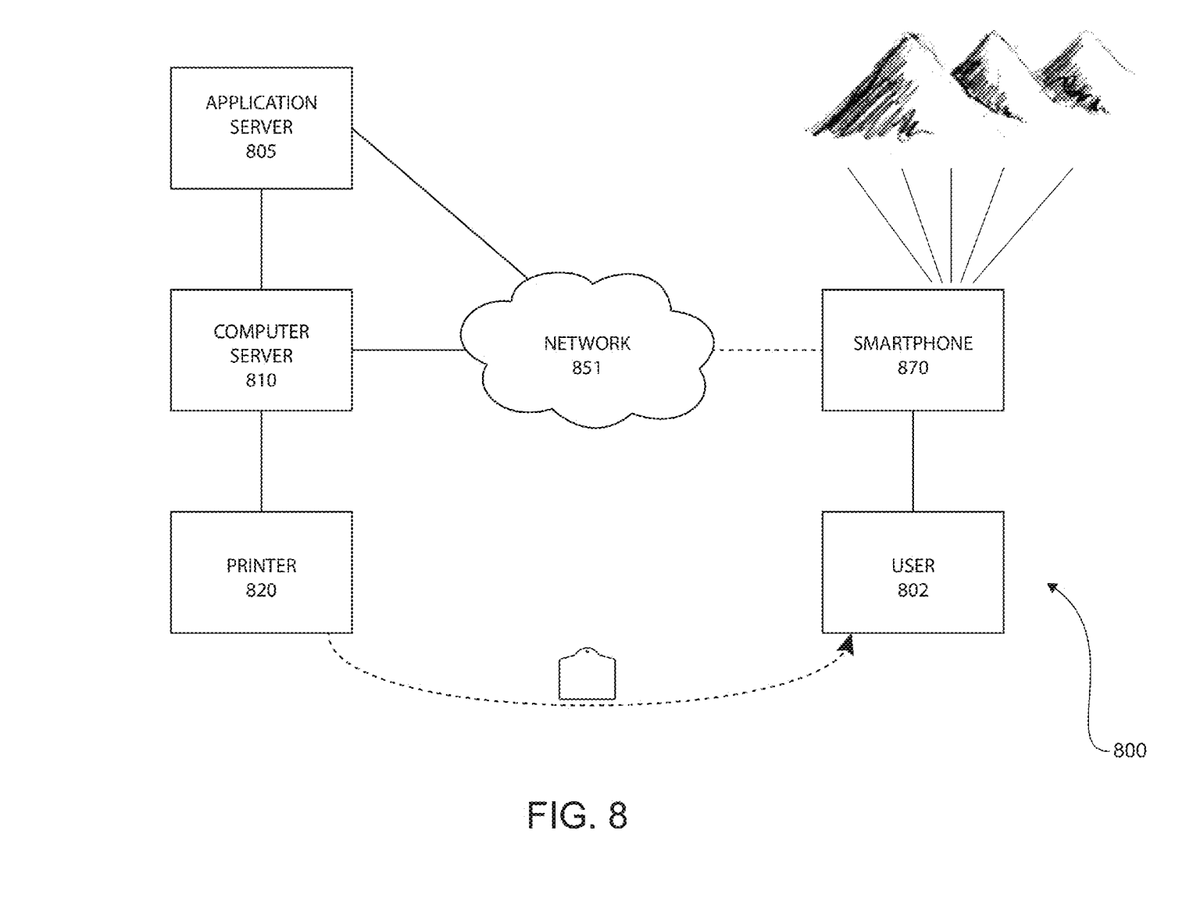
FIG. 8 illustrates another operating environment in which techniques disclosed herein may be utilized.

FIG. 8 illustrates operating environment 800 in which techniques disclosed herein may be utilized. Operating environment 800 includes user 802, smartphone 870, application server 805, computer server 810, printer 820, and network 851.

Computer server 810 is an example of computer server 110. Printer 820 is an example of printer 120. Smartphone 870 is an example of mobile computing device 160 or mobile computing device 170. In some cases, smartphone 870 includes a touch screen at which information is displayed and/or user input is received.

Network 851 is an example of network 151. Network 851 may include one or more networks such as the Internet, an intranet, a wireless network, a cellular network, a WiFi network, a LAN, and/or a WAN.

User 802 may be any person who is a user of smartphone 870. User 802 may use smartphone 870 to take pictures, as well as for other activities.

Application server 805 is any computing device for distributing information or software to other computing devices. Application server 805 may be a single computing device or may include functional elements that are contained within a plurality of other computing systems and/or distributed across a plurality of physical locations. In one example application server 805 may be contained within computer server 810. Application server 805 may be a server, a group of servers, a virtual machine, a personal computer, a group of personal computers, a notebook computer, or a computing device of another type, including combinations thereof. Application server 805 may include one or more of a variety of components such as: a user interface, a keyboard, a mouse, a display, a communication interface, a power supply, a volatile data storage device, and a nonvolatile data storage device.

The software application is a program which is executable or can become executable on a computer processor of smartphone 870 utilizing a computer operating system of smartphone 870. Different versions of the software may exist to support different operating systems such as, for example, Apple iOS® or Android®.

In one example of operation in operating environment 800, the software application is downloaded from application server 805 to smartphone 870 over network 851. The software application may be downloaded in response to a request from smartphone 870 that is transmitted directly to application server 805 or may be downloaded in response to a request received at application server 805 from computer server 810. In either case, the request may be generated as a result of an input received by smartphone 870 from user 802 at a user interface of smartphone 870. In some situations, application server 805 may be operated by a software application store that also makes other software applications available to users.

Once in operation, the software application permits user 802 to select from among photos stored in a memory of smartphone 870. Some or all of the photos may have been taken using a camera in smartphone 870. Alternatively, one or more of the photos may be attached to an email message accessed using smartphone 870 or retrieved from another type of data storage location accessed using smartphone 870.

The software application may require user 802 to provide a username, a password, an account identifier, or some other type of credential for placing an order for a photo tag. The software application may also permit user 802 to make formatting selections for the photo tag. Formatting selections may include selecting a size of the photo, selecting framing options for the photo, selecting an orientation of the photo. Formatting selections may also include, cropping the photo, rotating the photo, adjusting contrast of the photo, adjusting color of the photo, adjusting brightness of the photo, or performing one or more other image processing functions on the photo. One or more of the formatting options may be selected from among a list of predefined formatting options provided to user 802 on a display of smartphone 870 by the software application. Formatting selections and image processing functions may be applied to the selected photo by smartphone 870, computer server 810, or by a combination of smartphone 870 and computer server 810.

In one example, the software application provides user 802 a graphical depiction of how the selected photo will appear on a photo tag. The graphical depiction may contain an outline of a selected photo tag shape and an overlay of the photo onto that shape. User 802 then has the option to crop the photo, zoom in on the photo, or resize the photo in order to adjust how the photo will appear on the photo tag. The software application generates modified photo data based on the actions of user 802 and transmits the modified photo data to computer server 810. Depending on the size of the photo, the size of the photo file, and the type of the photo file, the software application may also perform additional processing on the photo data to adjust the file size and/or compress the photo data to a size that is appropriate for the size of photo tag. In one example, the photo may be of higher resolution and/or larger file size than is necessary based on the size of the photo tag and the software application may reduce the resolution and/or compress the image accordingly before transmission. The order may be transmitted to computer server 810 using an existing data service or data connection that has been previously established for smartphone 870, such as a wireless data service plan.

The software application may also permit user 802 to provide a message or other text to be printed on a photo tag. The user may enter the text on a user interface of smartphone 870 or may select from a list of predefined message provided by the software application. In addition, user 802 may provide or indicate shipping information for a photo tag using the software application. In one example, the user may manually enter the shipping information through the user interface of smartphone 870. In another example, the user may select from a list of previously entered shipping destinations that are stored in smartphone 870. In yet another example, a list of potential shipping destinations may be received from computer server 810 in response to a transmission of account information to computer server 810 by smartphone 870. This list of potential shipping destinations is displayed for selection by user 802 on smartphone 870. The list may have been previously entered and provided to computer server 810 by user 802 using smartphone 870 or using another computing device. In this way, the user can pre-populate the potential addresses (e.g., friends, grandparents, etc.) at a time that is more convenient and/or using a computer with a full sized keyboard and then conveniently select from that list when placing a photo tag order using smartphone 870.

The software application may be configured specifically for communicating with computer server 810 for purposes of placing photo tag orders. This allows user 802 to place photo tag orders with as little input and as few steps as possible. Use of a dedicated software application for this purpose provides a better user experience than would be obtained were user 802 to use a generic web browser in smartphone 870 to visit a website associated with computer server 810 and make all of the entries and selections for a photo tag order using that generic browser interface.

The software application may also give user 802 options for transmitting the selected photo and/or other information associated with the photo tag order to another destination. In one example, the software application may give user 802 the option of transmitting an electronic image of one or both sides of the ordered photo to be posted on a social media site such as Facebook®. In another example, an electronic image of one or both sides of the ordered photo may be sent in an email message. In yet another example, an email notification may automatically be sent to an eventual recipient of the photo tag to let them know the photo tag order has been placed.

Once computer server 810 has received all of the information associated with the order, additional steps may be performed before the photo tag is printed. For example, an account of user 802 may be checked to determine if the account has enough existing credit to pay for the ordered photo tag(s). User 802 may have set up the account at a prior time and pre-purchased a specific number of photo tags or simply applied a specified dollar amount of credit to their account. Computer server 810 may debit or decrement the account the appropriate amount before the photo tag is printed or before the printed photo tag is shipped to the specified address. Depending on how the account is established the account may be decremented based on the number of photo tags ordered (e.g. 2 tags ordered so the account balance is decremented from 7 available tags to 5 available tags) or may be debited by a specific currency amount for the photo tag ordered.

Once any necessary accounting has been conducted, the photo tag is printed as described above with respect to printer 120. Photo tags may be printed on individual pieces of rigid substrate. Alternatively, larger sheets of rigid substrate may be used such that multiple photo tags can be printed in a single print job or session. In the latter case, tracking information printed on the tags can be used to identify the tags and link them with their individual order and shipping information once they have been cut from the substrate. When orders are received they may be queued until enough orders are present to print an entire sheet of the rigid substrate. Photo tag orders from two or more users or customers may be printed on a single rigid substrate. The tracking information may also assist in associating the printed photo tags with the appropriate user or customer after they have been cut from the rigid substrate. In addition, an individual user may order multiple copies of the same photo tag. These multiple copies may be shipped to a same shipping destination or may each be shipped to different shipping destinations. Although the images and other stylistic features printed on these copies may be identical, the tracking information may differ in order to associate them with the different shipping addresses.

The methods and components described above are meant to exemplify some types of possibilities. In no way should the aforementioned examples limit the scope of the invention, as they are only exemplary embodiments.

The foregoing disclosure has been presented for purposes of illustration and description. Other modifications and variations may be possible in view of the above teachings. The examples described in the foregoing disclosure were chosen to explain the principles of the concept and its practical application to enable others skilled in the art to best utilize the invention. It is intended that the claims be construed to include other alternative embodiments of the invention except as limited by the prior art.

The phrases "in some embodiments," "according to some embodiments," "in the embodiments shown," "in other embodiments," "in some examples," "in some cases," "in some situations," "in one configuration," "in another configuration" and the like generally mean that the particular feature, structure, or characteristic following the phrase is included in at least one embodiment of the present invention and/or may be included in more than one embodiment of the present invention. In addition, such phrases do not necessarily refer to the same embodiments or different embodiments.

What is claimed is:

1. A method comprising the steps of:
   receiving, at a computer system from a mobile computing device of a user, order data for a photographic memento that includes photo data, formatting instructions, and information identifying an account of the user;
   printing, on a first side of a rigid substrate, a formatted image that is based on the photo data and the formatting instructions;
   wherein the rigid substrate is at least one of wood, metal, and plastic;
   printing, on a second side of the rigid substrate in an area aligned with the printed formatted image, supplemental information that is based on the order data;
   cutting the photographic memento from the rigid substrate in a predefined shape that includes the printed formatted image and the printed supplemental information;
   wherein the predefined shape is a tag shape having an aperture configured to facilitate hanging the photographic memento with the formatted image in an upright position on a display panel configured for displaying a plurality of the photographic mementos during use;
   generating shipping information for the photographic memento based on at least one of account information and the order data; and
   wherein the step of cutting the photographic memento from the rigid substrate includes die cutting the photographic memento from the rigid substrate and die cutting an aperture in the photographic memento, the aperture located in a position to facilitate hanging of the photographic memento in the upright position on the display panel configured for displaying a plurality of the photographic mementos of the predefined shape.

2. The method of claim 1 further comprising the step of cutting a second photographic memento from the rigid substrate in the predefined shape, the second photographic memento including a second formatted image and second supplemental information, the second formatted image being associated with another user.

3. The method of claim 1 wherein at least one dimension of the predefined shape is based on a dimension of a container configured for storing a plurality of photographic mementos.

4. The method of claim 1 further comprising the steps of:
   generating the account in the computer system prior to receiving the order data;
   establishing a credit amount associated with the account;
   identifying the account based on the received order data;
   verifying, before printing the photographic memento, that the credit amount is greater than or equal to a price for the photographic memento; and
   debiting the credit amount by the price after printing the photographic memento.

5. The method of claim 4 wherein the step of generating the account in the computer system includes receiving account information from the user via a website accessed by the user.

6. The method of claim 4 wherein the step of generating the account includes determining an integral number of available memento credits the user has paid for, and the method further comprising the steps of: verifying that the number of available memento credits is greater than zero; and decrementing the number of available memento credits in response to printing the photographic memento.

7. The method of claim 4 wherein: the step of generating the account in the computer system includes receiving a plurality of potential shipping destinations from the user; the order data includes a selection of one of the plurality of shipping destinations; and the shipping information is generated based on the selected shipping destination.

8. The method of claim 1 wherein the mobile computing device is a smartphone and the photo data originates from a camera of the smartphone.

9. The method of claim 1 further comprising the step of printing a second formatted image on the second side of the rigid substrate within the area before the step of cutting the photographic memento from the rigid substrate such that the photographic memento further includes the second formatted image.

10. The method of claim 1 wherein the formatting data includes a message, and further comprising the step of printing the message within the area on at least one of the first side of the rigid substrate and the second side of the rigid substrate before the step of cutting the photographic memento from the rigid substrate such that the photographic memento further includes the message.

11. The method of claim 10 wherein the formatting data further includes at least one of: a font type for the message, a font size for the message, a font color for the message, and a relative location of the message on the photographic memento.

12. The method of claim 1 wherein the formatting data includes framing information and the step of printing the formatted image includes printing a frame for the formatted image on the first side of the rigid substrate based on the framing information.

13. The method of claim 1 further comprising providing a software application for execution on the mobile computing device, wherein the order data at the computer system is received from the software application through the mobile computing device.

14. The method of claim 1 further comprising the steps of:
   printing the formatted image on the first side of the rigid substrate in another area of the rigid substrate that does not overlap the photographic memento;
   printing second supplemental information on the second side of the rigid substrate, wherein the second supplemental information is based on the order data; and
   cutting a second photographic memento from the rigid substrate in the predefined shape, the second photographic memento including the printed formatted image and the second supplemental information.

15. The method of claim 1 wherein the supplemental information includes order tracking information.

16. The method of claim 15 wherein the tracking information includes at least one of: a bar code, a magnetic strip, an electronic tag, and a quick response (OR) code.

17. The method of claim 1 further comprising the step of transmitting the formatted image from the computer system for delivery to a social media website in response to a request from the user.

18. The method of claim 1 wherein the rigid substrate comprises polyvinyl chloride.

19. A method of providing a user-reconfigurable photo display that includes a display panel, the method comprising the steps of:
- receiving a first photo order at a computer server over a network from a mobile computing device of a user, the first photo order including first image data and first formatting information;
- receiving a second photo order at the computer server from a mobile computing device of another user, the second photo order including second image data and second formatting information;
- printing a first formatted image on a first side of a planar rigid substrate in a first region and printing first supplemental information in the first region on a second side of the rigid substrate, wherein the first formatted image is based on the first image data and the first formatting information;
- wherein the rigid substrate is at least one of wood, metal, and plastic;
- printing a second formatted image on the first side of the rigid substrate in a second region and printing second supplemental information in the second region on the second side of the rigid substrate, wherein the second formatted image is based on the second image data and the first formatting information;
- die cutting a first photo tag from the first region of the rigid substrate in a designated shape that includes the printed first formatted image and the printed first supplemental information and die cutting a second photo tag from the second region of the rigid substrate in the designated shape that includes the printed second formatted image and the printed second supplemental information, wherein the first and second photo tags of the designated shape may be displayed on the display panel; and
- wherein the designated shape is a tag shape having an aperture configured to facilitate hanging the first and second photo tags on the display panel during use with the first and second formatted images in an upright position.

20. The method of claim 19 further comprising the step of providing a software application compatible with the computer server that, when executed by the mobile computing device of the user, configures the mobile computing device to generate the first photo order based on input from the user.

21. The method of claim 19 wherein the first photo order further includes a text passage and the first supplemental information includes the text passage.

22. The method of claim 19 wherein the first supplemental information includes a bar code containing tracking information for the first photo order.

23. The method of claim 19 wherein the first photo order further includes shipping information for the first photo tag.

24. The method of claim 23 wherein the shipping information includes a selection of a recipient of the first photo tag from a list of recipients created by the user and stored by the computer server prior to the receiving of the first photo order.

25. The method of claim 19 wherein the rigid substrate comprises polyvinyl chloride.

* * * * *